July 7, 1925.
A. V. SAMMIS
1,544,600
LIQUID PROJECTING DEVICE
Filed Aug. 13, 1918 2 Sheets-Sheet 1
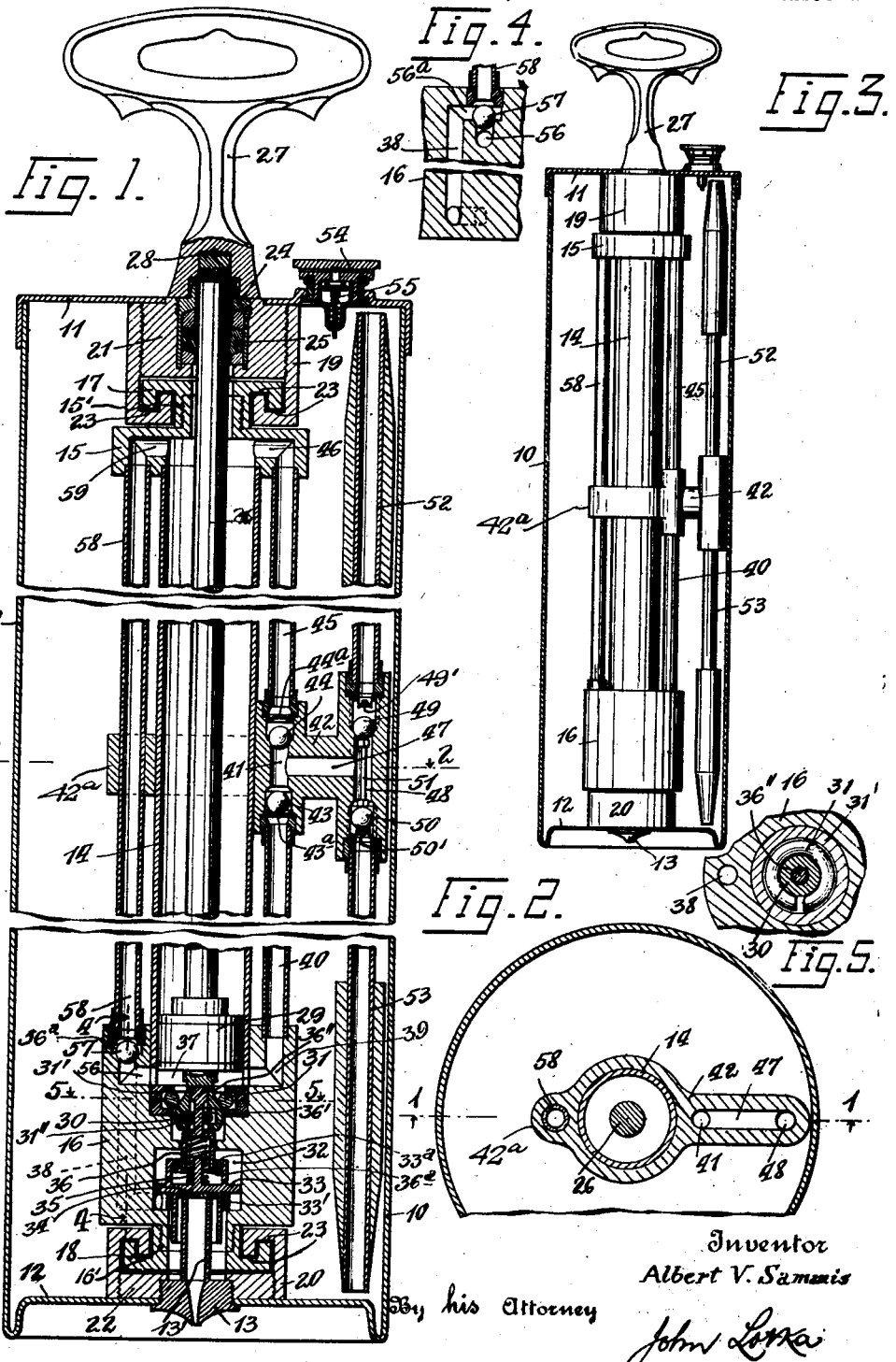
Inventor
Albert V. Sammis
By his Attorney
John Loska July 7, 1925.
A. V. SAMMIS
LIQUID PROJECTING DEVICE
Filed Aug. 13, 1918    2 Sheets-Sheet 2
1,544,600
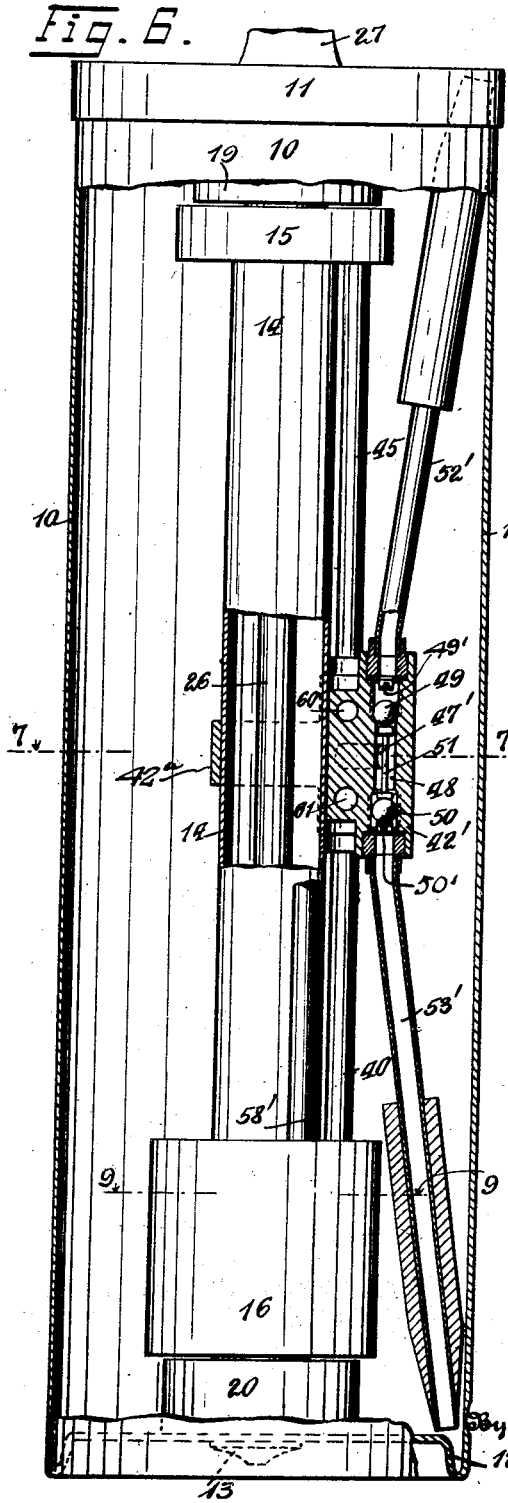
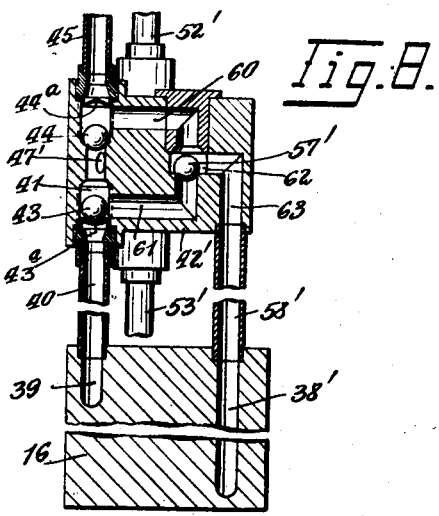
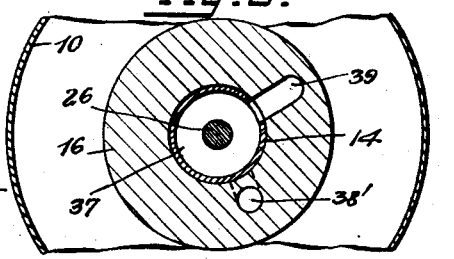
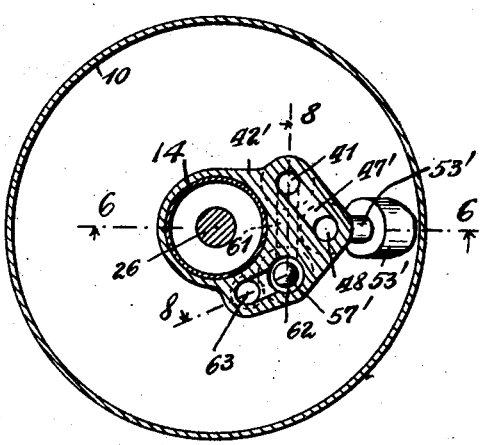
Inventor
Albert V. Sammis
By his Attorney
John Lotka Patented July 7, 1925.

1,544,600

UNITED STATES PATENT OFFICE.

ALBERT V. SAMMIS, OF HUNTINGTON, NEW YORK, ASSIGNOR TO FIRE GUN MANUFACTURING COMPANY INC., OF NEW YORK, N. Y., A CORPORATION OF NEW YORK.

LIQUID-PROJECTING DEVICE.

Application filed August 13, 1918. Serial No. 249,615.

*To all whom it may concern:*

Be it known that I, ALBERT V. SAMMIS, a citizen of the United States and resident of Huntington, in the county of Suffolk and State of New York, have invented certain new and useful Improvements in Liquid-Projecting Devices, of which the following is a specification.

My invention has for its object to provide a strong, compact, and permanently durable construction for apparatus employed as liquid-projectors, and while I have devised my improvement particularly for use in fire-extinguishers (employing carbon tetrachloride or other liquids), it will be obvious that the same features may be utilized in apparatus for spraying or projecting other liquid or semi-liquid substances, say for agricultural purposes, or for applying paints, cleaning fluids, etc.

Two forms of apparatus embodying my invention are illustrated by the accompanying drawings, in which Fig. 1 is a longitudinal or axial section taken on line 1—1 of Fig. 2, with parts broken away; Fig. 2 is a cross section on line 2—2 of Fig. 1; Fig. 3 represents the entire apparatus in side elevation, looking in the same direction as in Fig. 1, but showing only the receptacle in section; Fig. 4 is a partial vertical section taken on line 4—4 of Fig. 1; Fig. 5 is a detail horizontal section on line 5—5 of Fig. 1; Fig. 6 is a side elevation of another form of my invention, with parts in section on line 6—6 of Fig. 7; and parts broken away; Fig. 7 is a cross section on line 7—7 of Fig. 6; Fig. 8 is a longitudinal section on line 8—8 of Fig. 7; and Fig. 9 is a cross section substantially on line 9—9 of Fig. 6.

In each of the constructions illustrated, the apparatus comprises a receptacle having a preferably cylindrical shell 10, a top or head 11, and a bottom 12 to which is secured rigidly the nozzle 13, said bottom being preferably dished so that the nozzle will be protected when the lower edge of the receptacle is set on a table or other flat surface, as will be obvious from Figs. 1 and 3. Extending lengthwise of the receptacle is a pump, with its axis in the center of the shell 10, said pump comprising a cylinder or barrel 14, together with upper and lower heads 15 and 16 respectively secured thereto rigidly. The pump barrel, with the parts attached thereto, is mounted to turn about its longitudinal axis, relatively to the receptacle, and this may be accomplished in the following manner: The barrel heads 15, 16 are provided with screw-threaded, outwardly-extending sleeve portions 15', 16' respectively, adapted for connection with tubular members 17, 18 respectively provided with flanges adapted to turn between a stationary flange holder sleeve 19 or 20 respectively and an inner holder member 21 or 22 respectively on which said sleeve 19 or 20 respectively is secured. The flanges of the parts 17, 18 and 19, 20 are preferably overlapping or interlocking as shown, for the purpose of impeding the escape of liquid, and in order to secure a liquid-tight and airtight joint at these points, I prefer to place washers 23 against the plane end surfaces of the flanges. The holder member 22 may also have a screw connection with the nozzle 13, while the holder member 21 is centrally chambered at its outer portion to receive a screwed box or gland 24 containing packing rings 25 in engagement with the reciprocating piston rod 26. The outer end of this rod is screwed into a socket at the inner end of the handle 27, and I prefer to place a split lock-washer 28 of the well-known elastic type between the end of the rod 26 and the end wall of the socket, to prevent the rod and handle from coming apart after they have been screwed together. The rod 26 carries a piston 29 movable in the barrel 14, and is shown as extended downwardly beyond the piston, and this extension of the piston rod has an enlargement 30 preferably of rounded or pear-shape, adapted for locking engagement with a retaining member 31 constituted by an elastic split ring fitted in a stationary holder 31' located between the lower head 16 and the end of the barrel 14. By forcing the piston downward, the ring 31 is caused to expand so as to allow the enlargement 30 to pass beyond said ring, which then snaps back to the contracted locking position shown in Figs. 1 and 5, so that accidental outward movement of the piston is prevented. A sharp outward pull on the handle 27 will unlock the enlargement 30 from the retaining member 31. During the normal reciprocation of the piston, the retaining member also acts as a stop to limit the inward stroke of the piston.

The nozzle 13 is provided with an inward extension 13' passing through central openings in the sleeve 20 and the tubular member 10, without touching these parts, and into a chamber 32 of the lower barrel head 16. In this chamber is adapted to move a piston-like member 33, provided, on the side facing the nozzle, with a sleeve surrounding the extension 13' at a distance, and with a washer 34 adapted to engage the inner end of the extension 13', while on the side away from the nozzle, the member 33 is provided with a central stem surrounded by a coiled spring 35 the upper end of which is received in a cap 36 mounted to slide lengthwise in an opening which leads from the chamber 32 to a chamber 37 of the barrel head 16. The cap 36 is made with an upward extension 36' having an enlargement 36" at its upper end, to enter the hollow enlargement 30 of the piston rod and to co-operate with a retaining member or split ring 31" held in said enlargement 30. When the piston 29 is pushed in fully as in Fig. 1, the ring 31" will open and slip over the enlargement 36" and will then snap back into the position shown. The upper end of the enlargement 36" will then be engaged by the piston rod as shown, thus pressing the cap 36 downwardly and through the medium of the spring 35 forcing the member 33 in a like direction to close the inner end of the extension 13' by engagement with the washer 34, acting as a valve. The two members 36 and 33 might form a rigid unit, but the interposition of the spring 35 insures a proper fit of the valve, without requiring absolute accuracy in the relative positioning of the cap 36 and of the piston rod 26. In the head 16 is a discharge channel 38 (38' in Figs. 6 to 9) opening into the chamber 32 below the piston member 33. When the piston is reciprocated, the pressure of the liquid acting on the piston member 33 will lift it to unseat the valve 34 and allow the liquid to pass from the chamber 32 into the nozzle 13. If desired, a spring 33' may be employed to assist in lifting the valve 34 off its seat as soon as the piston rod 26 is drawn outwardly. The members 33 and 36 are shown as provided with overlapping flanges 33ª, 36ª extending inwardly and outwardly respectively. When the piston is pulled out to start the operation of the pump, the members 36, 33 will thus be taken along to open the valve 34 until said members are arrested by the flange 33ª coming in contact with the upper wall of the chamber 32, and then the ring 31" will yield to allow the extension 30 to become separated from the extension 36'.

From the chamber 37 a channel 39 leads to a tube 40 connected to a chamber 41 in a valve casing 42 (42' in Figs. 6 to 9), the connection being controlled by a valve 43 opening toward the channel 39, and at the upper end of the chamber 41 is located a similar valve 44 controlling the connection of said chamber with a tube 45 leading to a channel 46 in the upper barrel head 15, said channel being open to the upper end of the pump barrel 14. Apertured stops 43ª, 44ª serve to limit the movement of the valves 43, 44 from their seats. From the chamber 41, between the valves 43, 44, a channel 47 (47' in Figs. 6 to 9) leads to a suction chamber 48 in the casing 42 (42'), said chamber having outwardly-facing seats for gravity valves 49, 50, between which is interposed (preferably loosely) a separator 51 of such length as to insure that at any time at least one of said valves 49, 50 will be open. Apertured stops 49', 50' serve to limit the movement of the valves 49, 50 from their seats. Said valves control the connection of the chamber 48 with the intake tubes 52, 53 (52', 53' in Figs. 6 to 9) rigid with the casing 42 (42') and having their ends adjacent to the receptacle heads 11, 12 respectively, near the periphery thereof. The casing 42 (42') is rigid with the pump barrel 14, and a strap 42ª may extend from said casing and embrace the barrel. At a suitable point of the receptacle, say on the upper head 11, may be located a filling opening normally closed by a plug 54, provided with an air-vent controlled by a valve 55, so that air may enter the receptacle as liquid is expelled therefrom.

So far as described above, the two constructions illustrated are substantially alike, and the description given above will therefore apply to both.

In Figs. 1, 2, 3 and 4, the lower head 16 has a channel 56 communicating with the lower end of the pump barrel through the chamber 37 of said head, and leading to a chamber 56ª containing a valve 57 and connected by a pipe 58 to a channel 59 in the upper head 15, which channel is in permanent communication with the upper end of the pump barrel 14. The chamber 56ª has two seats for the valve 57, and according to the position of said valve, the chamber 56ª, which is in permanent communication with the discharge channel 38, also communicates either with the channel 56 or with the pipe 58, that is to say, with either the lower or the upper end or compartment of the pump barrel 14.

With either form of my invention, the intakes 52, 53 (or 52', 53'), being to one side, will cause the barrel 14 to turn about its axis so that the free ends of said intakes will be adjacent to the lowermost points of the heads 11, 12 whenever the receptacle is held in a horizontal or inclined position, as it generally will be. In fact, the intakes will gravitate to a definite position whenever the receptacle is held in any but a strictly vertical position. At least one of the intakes will always be at the lower portion of the receptacle, and therefore dip into the liquid whether the receptacle is full, or partly emptied. Whenever the receptacle is in any but a perfectly horizontal position, the gravity valve 49 or 50 which is temporarily the upper valve, will be seated to cut off the connection of the suction chamber 48 with that intake which is temporarily the upper intake, thus preventing the drawing of air into the suction chamber, from the upper part of the receptacle, when the latter is only partly filled. The lower gravity valve will be unseated by gravity, assisted by the action of the separator 51, so that the suction chamber 48 will communicate with the lower intake. If the receptacle is held perfectly horizontal, the chamber 48 may possibly communicate with both intakes at the same time, but this will not be objectionable, since in such case the free ends of both intakes will inevitably dip into the liquid.

When the piston 29 is reciprocated by means of the handle 27, the following operation takes place, with the construction illustrated by Figs. 1 to 5: At the upstroke or outward stroke of the piston, any liquid contained in the barrel 14 above the piston will exert pressure, through the channel 46 and pipe 45, to close the valve 44, and such liquid will be forced through the channel 59 and pipe 58, pressing the valve 57 against its lower seat, so that such liquid may enter the chamber 56ª and pass through the discharge channel 38 to the chamber 32 and nozzle 13; the pressing of the valve 57 against its lower seat cuts off the chamber 56ª from the compartment of the pump barrel 14 below the piston. During this upstroke, the suction exerted by the piston will cause liquid to enter the lower compartment of the pump barrel 14, from the channel 39, pipe 40 (the valve 43 opening in response to such suction), chamber 41, channel 47, suction chamber 48, and one of the intakes 52, 53 (or both) according to the position in which the receptacle is held, as explained above. During the inward or downstroke of the piston 29, the pressure exerted on the liquid in the barrel 14 below the piston will cause the valve 43 to close, and the valve 57 to be lifted from its lower seat against its upper seat, so that the chamber 56ª will be cut off from communication with the pipe 58, but connected with the channel 56. The liquid under pressure will thus pass from the lower compartment of the pump barrel and chamber 37 to the channel 56, chamber 56ª, discharge channel 38, chamber 32 and nozzle 13. At the same time during this downstroke, the suction created above the piston 29 will cause liquid to flow into the upper compartment of the pump barrel through the channel 46, pipe 45 (the valve 44 opening in response to such suction), chamber 41, channel 47, suction chamber 48, and again one or the other of the intakes 52, 53 (or both) according to the position in which the receptacle is held. The pump is thus double-acting, and will deliver a continuous jet of liquid irrespective of the position in which the receptacle is held.

The construction shown in Figs. 6 to 9 differs from the one illustrated by Figs. 1 to 4, partly in certain details or proportions, as to the casing 42' and the intakes 52', 53', and partly as to the arrangement of valves and connecting channels. The valve casing 42' is more compact than the casing 42, and thus has the suction chamber 48 nearer to the center or axis of the receptacle, as will be seen by comparing Figs. 1 and 2 with Figs. 6 and 7. The intakes 52', 53' are therefore given an oblique position in order that their free ends may be at substantially the same points of the receptacle as in Figs. 1 and 3. In addition to these minor differences, there are the following ones: The channel 56, valve 57, and chamber 56ª are omitted, and the discharge channel 38' communicates directly and permanently with the pipe 58' which however does not extend to the upper pump barrel head 15, and the latter is made without the channel 59. The position of the chamber 41 and of the channel 47' connecting the chambers 47' and 48 is slightly re-arranged (Fig. 7), but substantially the same as before described. The pipes 40 and 45, in addition to the valved connections with the chamber 41, have permanent communication with channels 61 and 60 respectively, the connection of which with a discharge chamber 62 is controlled by a valve 57', movable between two seats. The chamber 62 is in permanent communication with the channel 63 and through it with the pipe 58'.

In this second form of my invention the pump will operate as follows:

During the upstroke or outward stroke of the piston any liquid contained in the barrel 14 above the piston 29 will be forced out through the channel 46, pipe 45, (forcing the valve 44 to its seat as shown in Fig. 8), channel 60, chamber 62 (forcing the valve 57' to its lower seat), channel 63, pipe 58', channel 38', chamber 32, and nozzle 13. During this outward stroke, the suction created below the piston will draw liquid into the lower end of the pump barrel through channel 39, pipe 40, (valve 43 being open), chamber 41, channel 47', suction chamber 48, and one or the other of the intakes 52', 53', or both, according to the position of the receptacle. During the downward or inward stroke of the piston, the liquid below the piston will be expelled from the pump barrel through channel 39, pipe 40 (closing the valve 43) channel 61 (forcing the valve 57' against its upper seat), chamber 62, channel 63, pipe 58′, discharge channel 38′, chamber 32, and nozzle 13. At the same time, the suction created in the upper compartment of the pump barrel will cause liquid to be drawn into this compartment through channel 46, pipe 45 (valve 44 opening in response to suction), chamber 41, channel 47′, chamber 48, and one or the other of the intakes 52′, 53′, or both, as explained above.

I desire to call particular attention to the fact that my improved pump has joints of such character as to prevent the drawing of air into the pump barrel from the upper portion of the receptacle, which upper portion of course contains air as soon as the pump has expelled some of the liquid from the receptacle. Thus, by looking at Fig. 1, and assuming that the apparatus is used in about the position shown, that is to say, with the nozzle 13 pointing downward, it will be seen that at each downstroke or inward stroke, the piston 29, by its tendency to take the barrel 14 along through friction, will press the grooved portions of the flanged tubular member 17 downwardly against the cylindrical flange at the inner end of the holder sleeve 19, and will at the same time press the cylindrical flange of the member 17 against the grooved portion of the sleeve 19 thus compressing the washers 23 at the interlocking flanges of the parts 17, 19, and obtaining an air-tight joint. Similarly, if the apparatus is used with the nozzle 13 pointed upwardly, the outward movement of the piston 29, by its tendency to take along the barrel 14, will press the flanged tubular member 18 against the flange at the inner end of the holder sleeve 20, thus compressing the washers 23 at the interlocking flanges of the parts 18, 20, and therefore insuring an air-tight joint at the upper end of the pump barrel, whether the apparatus has its nozzle pointed upwardly or downwardly. It will be noted that the cylindrical flanges of the holder sleeves 19, 20 are of smaller diameter than those of the members 17, 18, but concentric or co-axial therewith, and are fitted into them so as to be surrounded thereby, so that the flanges at the same end of the pump overlap longitudinally and will lie, at least in part, in the same transverse plane. Furthermore, during the outward stroke of the piston, the tight joint formed between the flanges of the parts 18 and 20 also prevents the escape or return of liquid under pressure, from the chamber 32 into the main space of the receptacle.

Various modifications may be made without departing from the nature of my invention as set forth in the appended claims.

I claim:

1. In a liquid-projecting device, a receptacle provided with an outlet, and bearings adjacent to the ends of the receptacle, a pump having a barrel with heads mounted to turn in said bearings and provided with channels for taking liquid from the receptacle and ejecting such liquid through the outlet, said bearings and heads being provided with interlocking flanges to produce tight joints, and a piston arranged to reciprocate in said barrel and provided with a handled rod extending to the outside of the receptacle.

2. In a liquid-projecting device, a pump comprising a barrel, a piston reciprocating in said barrel and provided with an operating rod, a valve carried by the pump barrel and adapted to seal the outlet of the pump, co-operating connecting means related to said valve and piston respectively, and adapted to effect an operative connection between the piston and the valve when the piston is pushed in fully, and a stop located between the piston and said valve to arrest the outward movement of the valve as it is carried along by the outwardly-moving piston, and cause the connection between the piston and the valve to be broken.

3. In a liquid-projecting device, a pump provided with an outlet and comprising a barrel, a reciprocating piston member, a valve adapted to seal said outlet, co-operating connecting means related to said valve and to said reciprocating member respectively, and adapted to connect said member and valve when said member is pushed inward, and to pull the valve away from the seat when the said member is pulled outwardly, and a stop to limit the outward movement of the valve and cause it to become disconnected from the reciprocating member by the continued pull of the latter on its outward stroke.

4. In a liquid-projecting device, a pump provided with an outlet and comprising a barrel, a reciprocating piston member, a valve adapted to seal said outlet, an elastic separable connection between said member and said valve, and a stop to arrest the outward movement of the valve as it is carried from its seat by the said member and cause the separation of said member from the valve.

5. In a liquid-projecting device, a pump provided with an outlet and comprising a barrel, a reciprocating piston member, an outlet-sealing valve having a limited movement in the same direction as said member but of smaller extent, an elastic separable connection between said valve and said member for simultaneous movement in either the outward or the inward direction, and means for locking the reciprocating member against longitudinal movement, by pushing said member inward to the position in which it seats said valve to seal the outlet.

6. In a liquid-projecting device, a receptacle provided with an outlet, a valve casing located in the receptacle about midway between its ends and movable in a circular path centered on the longitudinal axis of said receptacle, said casing having an intake chamber, intakes located in said receptacle and having their adjacent ends attached to said valve casing while their remote free ends are adjacent to the ends of the receptacle, gravity valves located in said casing and controlling said intakes, a double-acting pump located in said receptacle and operatable from the outside thereof, suction valve mechanism located in said casing and controlling the connection of the pump compartments with the intake chamber of said casing irrespective of the position taken by said valve casing while it swings in said circular path, and valve mechanism extraneous to the pump controlling the connection of said pump with the outlet of the receptacle irrespective of the position taken by said valve casing while it swings in said circular path.

7. In a liquid-projecting device, a receptacle provided with an outlet, a pump located within said receptacle and arranged to produce a discharge of the contents through said outlet, said pump including a barrel and a reciprocating member, and a split ring for holding said reciprocating member, when pushed in fully, against longitudinal movement.

8. In a liquid-projecting device, a receptacle provided with an outlet, a pump located within said receptacle and arranged to produce a discharge of the contents through said outlet, said pump including a barrel and a reciprocating member, a valve controlling said outlet of the receptacle, and adapted to be forced to its closing position by said reciprocating member when the latter is pushed in fully, and an elastic connecting device between said valve and said reciprocating member to cause the outward movement of said member to first carry said valve to the open position, and then separate the reciprocating member from the valve.

9. In a liquid-projecting device, a receptacle provided with an outlet, a pump located within said receptacle and arranged to produce a discharge of the contents through said outlet, said pump including a barrel and a reciprocating member, a valve controlling said outlet of the receptacle, and adapted to be forced to its closing position by said reciprocating member when the latter is pushed in fully, and a split ring for temporarily connecting said valve with the reciprocating member to cause the outward movement of said member to first carry said valve to the open position and then separate the reciprocating member from the valve.

10. In a liquid-projecting device, a receptacle provided with an outlet, a pump having a barrel mounted to turn and having heads within said receptacle, said pump being provided with channels for taking liquid from the receptacle and ejecting such liquid through said outlet, a piston arranged to reciprocate in said barrel and provided with a handled rod extending to the outside of the receptacle, and packings located on the outside of each barrel head, between such head and the adjacent inner face of the receptacle, whereby the motion of the piston, when it tends to take the barrel along with the piston, will press the barrel head against the adjacent packing and the latter against the adjacent inner face of the receptacle.

In testimony whereof I have signed this specification.

ALBERT V. SAMMIS.